(12) United States Patent
He et al.

(10) Patent No.: US 8,942,008 B2
(45) Date of Patent: Jan. 27, 2015

(54) ELECTRONIC DEVICE WITH RISER CARD

(75) Inventors: Yu-Wei He, Shenzhen (CN); Wen-Da Zhang, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 182 days.

(21) Appl. No.: 13/474,810

(22) Filed: May 18, 2012

(65) Prior Publication Data

US 2013/0077261 A1 Mar. 28, 2013

(30) Foreign Application Priority Data

Sep. 26, 2011 (CN) .......................... 2011 1 0288034

(51) Int. Cl.
- *H05K 7/02* (2006.01)
- *G06F 1/18* (2006.01)
- *H05K 7/04* (2006.01)
- *H05K 1/14* (2006.01)

(52) U.S. Cl.
CPC ...................................... *G06F 1/183* (2013.01)
USPC ............ 361/810; 361/809; 361/807; 361/752

(58) Field of Classification Search
USPC .................... 361/810, 807, 728, 736, 679.01, 361/679.02, 679.31, 748; 439/296, 338
See application file for complete search history.

(56) References Cited

U.S. PATENT DOCUMENTS

| | | | | |
|---|---|---|---|---|
| 7,578,689 | B2 * | 8/2009 | Guan et al. | 439/327 |
| 7,898,800 | B2 * | 3/2011 | Fan et al. | 361/679.56 |
| 8,475,195 | B2 * | 7/2013 | Annis et al. | 439/328 |
| 2009/0073666 | A1 * | 3/2009 | Tsai et al. | 361/740 |
| 2011/0116229 | A1 * | 5/2011 | Hsieh et al. | 361/679.58 |

* cited by examiner

*Primary Examiner* — Zachary M Pape
*Assistant Examiner* — Douglas Burtner
(74) *Attorney, Agent, or Firm* — Novak Druce Connolly Bove + Quigg LLP

(57) ABSTRACT

An electronic device includes a chassis, a mounting assembly, and an assisting member. The mounting assembly is secured to the chassis and includes a circuit board and a connector secured to the circuit board. The signal module is secured to the chassis and includes a signal card, and the signal card is engaged with the connector. The assisting member is secured to a first end of the mounting assembly and includes an assisting corner. The assisting corner abuts the signal module. The connector is located between the assisting corner and a second end of the mounting assembly, which is opposite to the first end. The second end rotates about the assisting corner, and the connector disengages from the signal card when the second end is rotated about the assisting corner.

18 Claims, 6 Drawing Sheets

ELECTRONIC DEVICE WITH RISER CARD

BACKGROUND

1. Technical Field

The present disclosure relates to electronic devices, and particularly to an electronic device with a riser card.

2. Description of Related Art

Expansion cards, such as graphic adapter cards, are used in an electronic device, such as a server. The graphic adapter cards are secured to a riser card, and a size of the riser card is substantially equal to a size of a motherboard of the electronic device. A plurality of pairs of connectors is secured to the riser card and the motherboard. A signal card is secured between each of the plurality of pairs of connectors, to connect each riser card to the motherboard. When a riser card has to be removed from the motherboard, a lever principle is used to raise a first end of the riser card to overcome the clamping force holding each of the connectors and the signal card together, to disengage a first end of each of the connectors from the signal card, and to disengage a second end of the riser card from the signal card. However, when a first end of the riser card is raised, a second end of each of the connector becomes a pivot of a lever and sustains a crushing force. The crushing forcing on the second end of each of the connectors may cause damages to one of the connectors. Therefore, an improved electronic device with a riser card may be desired within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
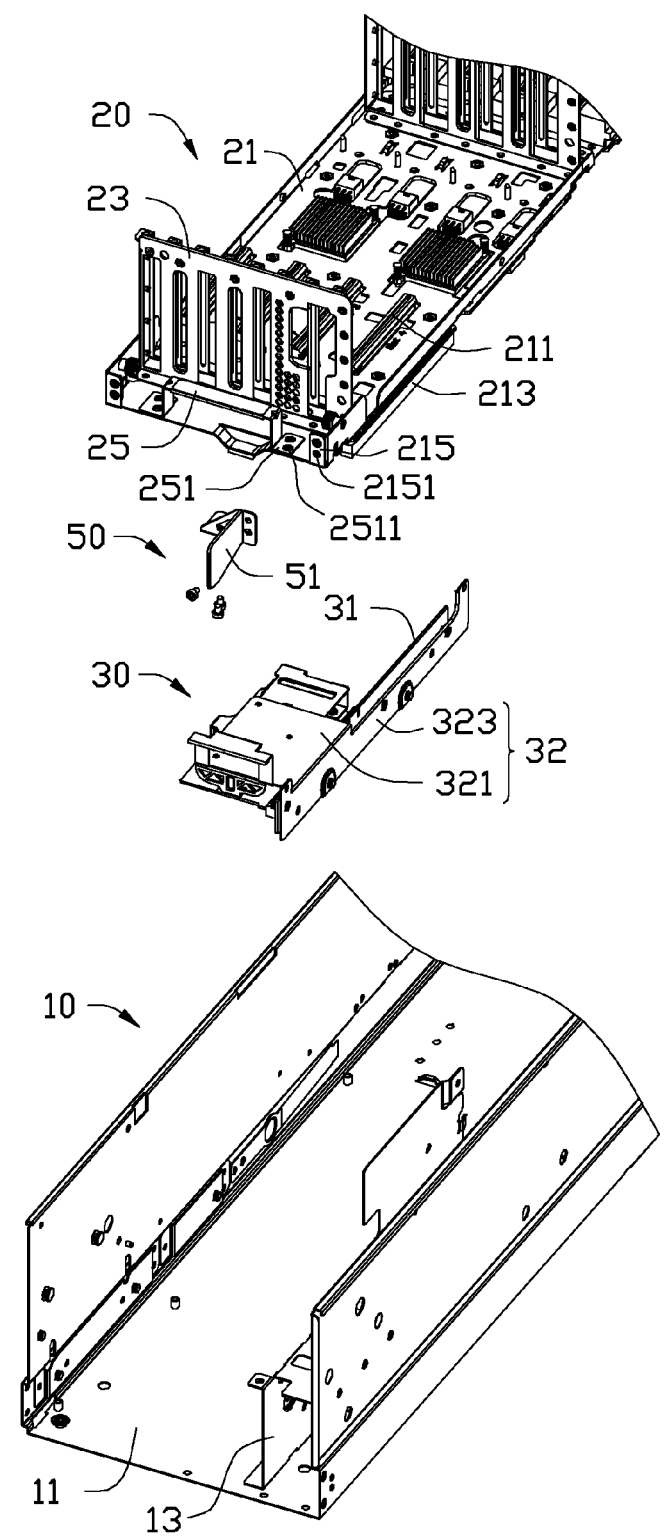
FIG. 1 is an exploded, isometric view of an electronic device in accordance with an embodiment.

FIG. 1 shows an electronic device in accordance with an embodiment including a chassis 10, a mounting assembly 20, a signal module 30, and an assisting member 50. In one embodiment, the electronic device is a server.

The chassis 10 includes a bottom plate 11. A motherboard (not shown) and a bracket 13 are secured to the bottom plate 11.

The mounting assembly 20 includes a circuit board 21 and a frame 23 secured to the circuit board 21. A plurality of inserting members 211 is located on a top surface of the circuit board 21. A plurality of connectors 213 is secured to a bottom surface of the circuit board 21. In one embodiment, the mounting assembly 20 is configured for mounting a plurality of expansion cards (not shown). Each of the plurality of expansion cards is inserted in each of the plurality of inserting members 211 and secured to the frame 23. A locking piece 215 extends from a first end of the circuit board 21. The locking piece 215 defines two locking holes 2151. A mounting member 25 is secured to the first end of the circuit board 21. The mounting member 25 includes a mounting piece 251. The mounting piece 251 abuts the circuit board 21 and defines two mounting holes 2511. Each of the two mounting holes 2511 is a through hole through the circuit board 21. In one embodiment, an operating frame 27 is secured to a second end of the circuit board 21 (shown in FIG. 3); the mounting piece is substantially perpendicular to the circuit board 21; the circuit board 21 is a riser card, and the expansion card is a graphic adapter card.

The signal module 30 includes a signal card 31 and a case 32. The case 32 includes a top wall 321 and a sidewall 323. The signal card 31 is secured to an inner surface of the sidewall 323. In one embodiment, the top wall 321 is substantially perpendicular to the sidewall 323.

Figure 2:
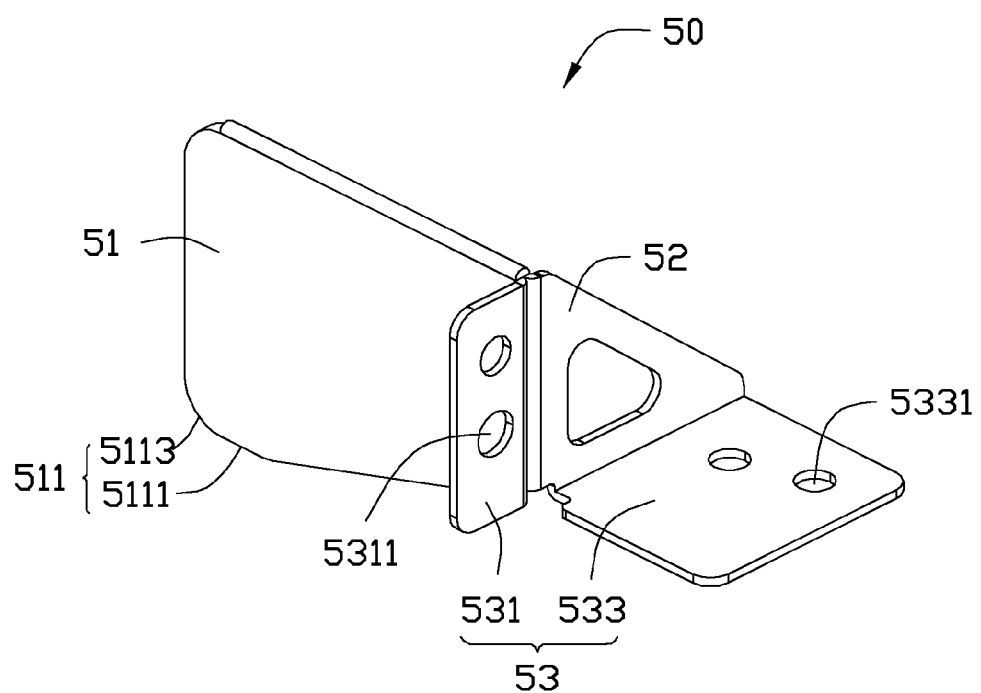
FIG. 2 is an isometric view of an assisting member of FIG. 1.

FIG. 2 shows the assisting member 50 including a limiting portion 51, a connecting portion 52, and an installation portion 53. The limiting portion 51 defines an assisting corner 511 between a first side surface and a bottom surface of the limiting portion 51. The bottom surface of the limiting portion 51 is adjacent to the first side surface of the limiting portion 51. The assisting corner 511 includes an assisting portion 5111 and a rotating portion 5113. The assisting portion 5111 is obliquely connected to the bottom surface of the limiting portion 51. The rotating portion 5113 is connected to the first side surface of the limiting portion 51. In one embodiment, each of the limiting portion 51 and the connecting portion 52 is made of thin plate, and the rotating portion 5113 is curved. The installation portion 53 includes a first installation piece 531 and a second installation piece 533. The first installation piece 531 extends from a second side surface of the limiting portion 51 along a first direction, the second side surface is opposite to the first side surface. The connecting portion 52 extends from the second surface of the limiting portion 51 along a second direction which is opposite to the first direction. In one embodiment, the first direction and the second direction are substantially perpendicular to the limiting portion 51, and the first installation piece 531 and the second installation piece 533 are substantially perpendicular to the limiting portion 51. The connecting portion 52 connects the second installation piece 533 to the limiting portion 51. The second installation piece 533 extends from a bottom edge of the connecting portion 52 and is substantially perpendicular to the connecting portion 52. The first installation piece 531 defines two first installation holes 5311. The second installation piece 533 defines two second installation holes 5331.

Figure 3:
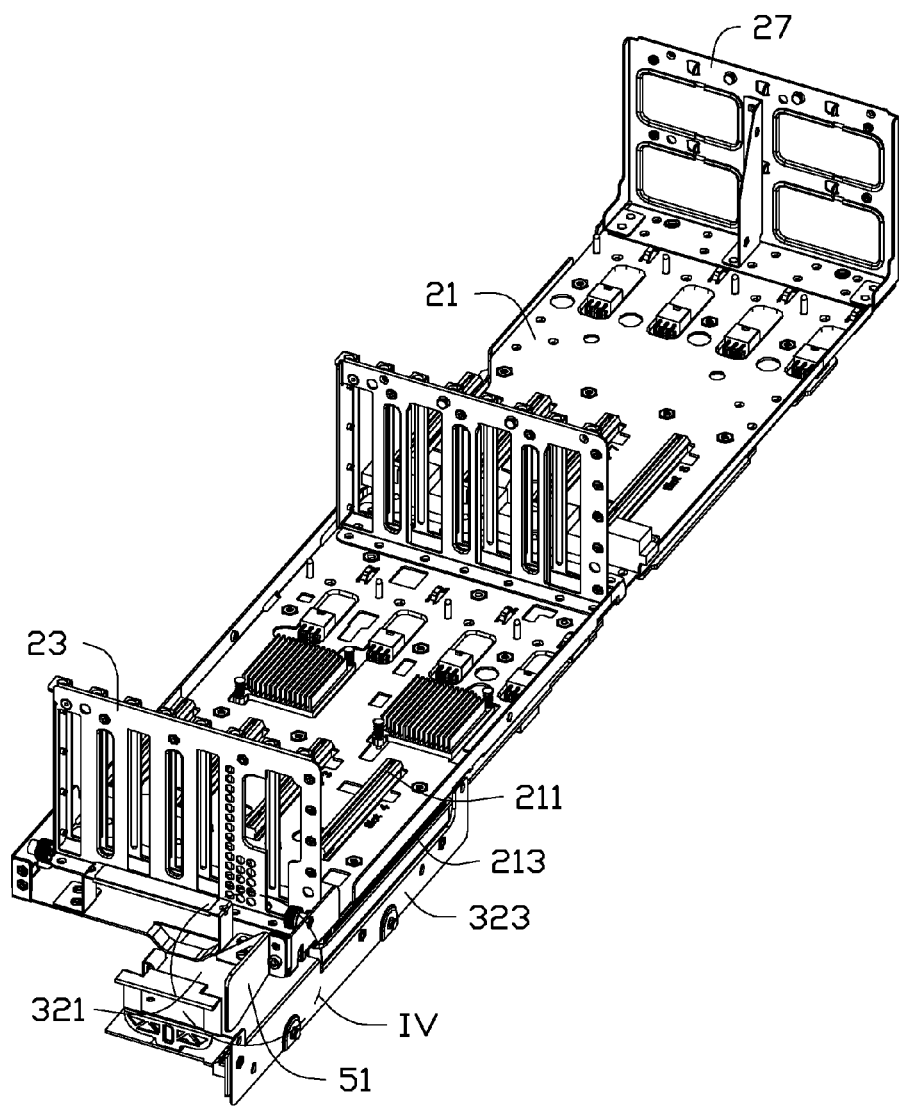
FIG. 3 is an assembled, isometric view of the objects in FIG. 1, the chassis not being shown.
Figure 4:
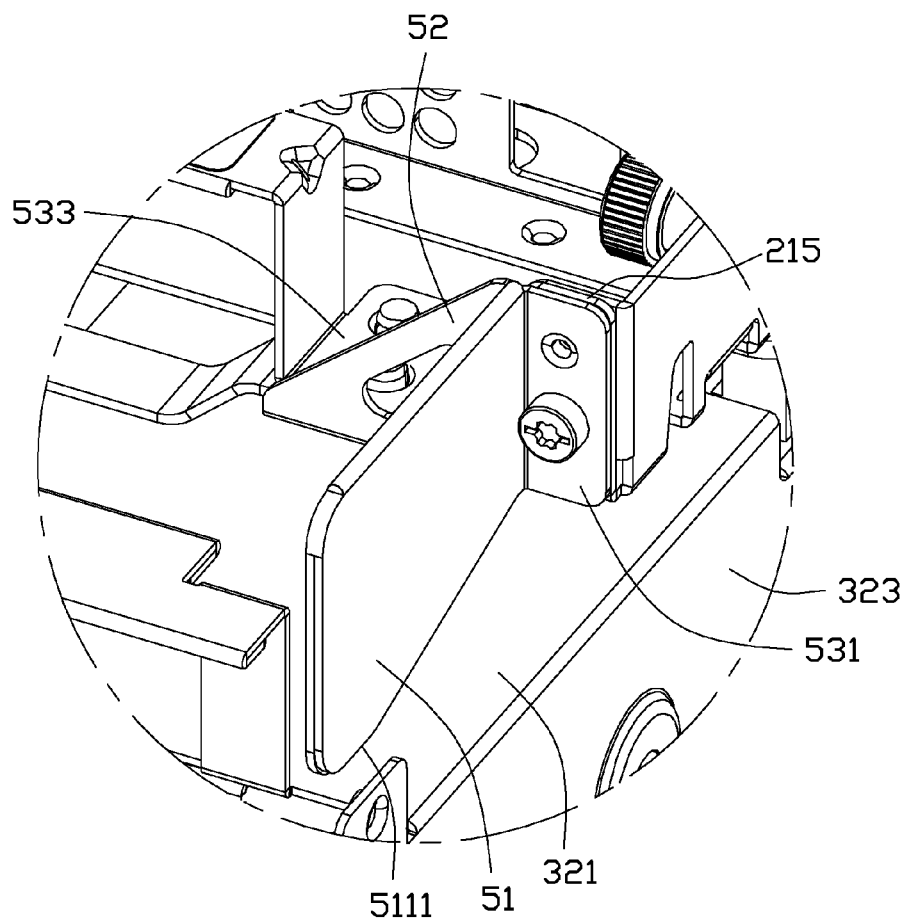
FIG. 4 is an enlarged view of a circled portion VI of FIG. 3.
Figure 5:
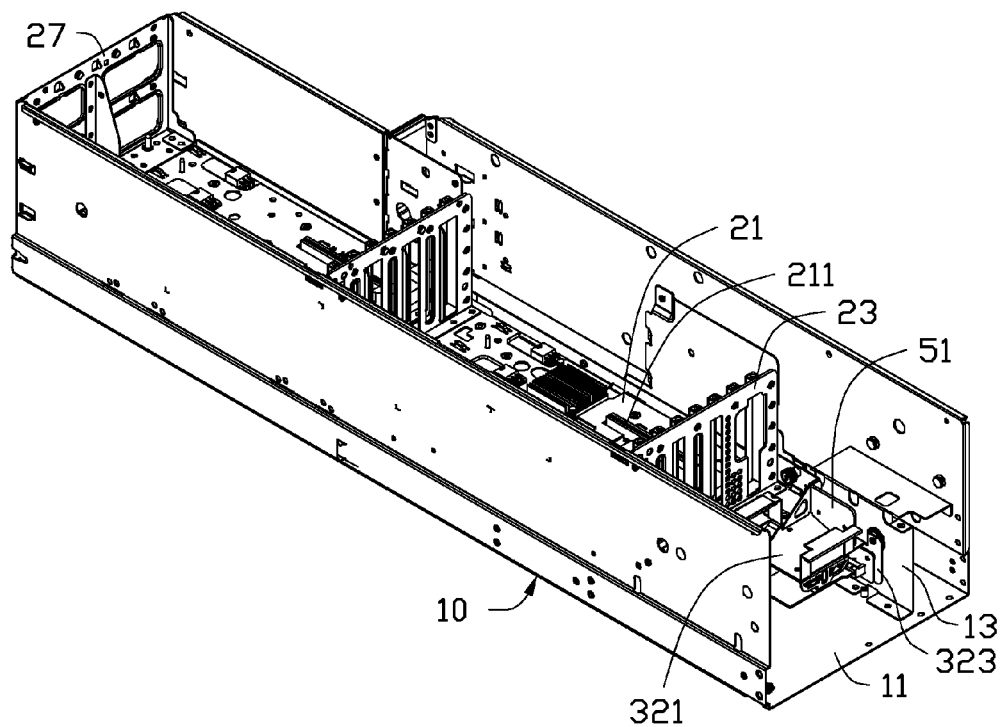
FIG. 5 is an assembled, isometric view of the electronic device of FIG. 1.

FIGS. 3-5 show that, in assembly, the assisting member 50 is moved to the first end of the circuit board 21. The first installation piece 531 abuts the locking piece 215, and each of the two first installation holes 5311 is aligned with each of the two locking holes 2151. The second installation piece 533 abuts against the mounting piece 251, and each of the two second installation holes 5331 is aligned with each of the two mounting holes 2511. A locking member (not shown), such as a screw, is inserted into each of the two first installation holes 5311 and each of the two locking holes 2151, and each of the two second installation holes 5331 and each of the two mounting holes 2511. Thus, the assisting member 50 is secured to the mounting assembly 20. The signal card 31 is secured to the motherboard, and the sidewall 323 is secured to the bracket 13. The mounting assembly 20 is placed in the chassis 10, and each of the plurality of connectors 213 is inserted into each of the signal card 31. The assisting portion 5111 abuts the top wall 321. Each of the plurality of connectors 213 is located between the assisting corner 511 and the second end of the circuit board 21. The top wall 321 is substantially parallel to the bottom plate 11 and located between the bottom plate 11 and the assisting member 50.

Figure 6:
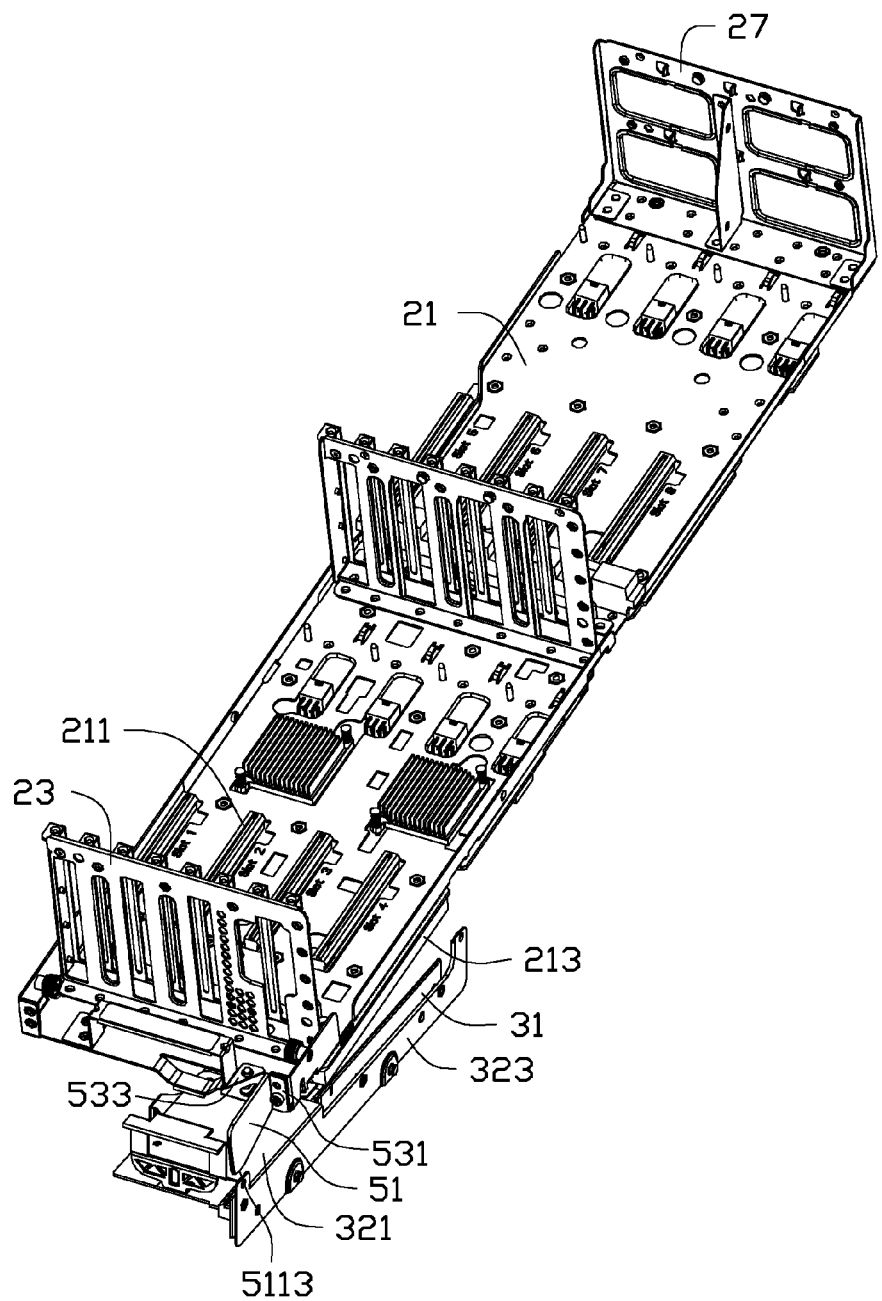
FIG. 6 is similar to FIG. 3, but a first end of the mounting assembly is disengaged from a signal card.

FIG. 6 shows that, to disassemble the mounting assembly 20, the second end of the circuit board 21 is raised up. The second end of the connector 213 is disengaged from the signal card 31, and the mounting assembly 20 is rotated about the assisting portion 5111, until the assisting portion 5111 disengages from the top wall 321. The mounting assembly 20 is rotated about the rotating portion 5113, until the first end of the connector 213 is disengaged from the signal card 31. In this process, the mounting assembly 20 is rotated about the assisting corner 511, and the force generated by the assisting corner 511 when the mounting assembly 20 is rotated is taken by the top wall 321. Thus, the force on the second end of the connector 213 is greatly reduced. Furthermore, a rotating angle of the second end of the connector 213 is reduced, and the second end of the connector 213 does not abut the signal card 31.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   a chassis;
   a mounting assembly secured to the chassis and comprising a circuit board and a connector secured to the circuit board;
   a signal module secured to the chassis and comprising a signal card, and the signal card is engaged with the connector; and
   an assisting member secured to a first end of the mounting assembly and comprising an assisting corner, and the assisting corner abutting the signal module;
   wherein the connector is located between the assisting corner and a second end of the mounting assembly, and the second end is opposite to the first end; the second end is rotatable about the assisting corner, the assisting member is rotatable together with the second end, and the connector is disengaged from the signal card when the second end and the assisting member are rotated about the assisting corner; the assisting member comprises a limiting portion, a connecting portion and an installation portion; a corner of the limiting portion defining the assisting corner; the assisting corner comprising an assisting portion and a rotating portion, and the assisting portion abuts the signal module; the installation portion comprises a first installation piece and a second installation piece; the connecting portion connects the limiting portion to the second installation piece; and the first installation piece and the second installation piece are secured to the mounting assembly.

2. The electronic device of claim 1, wherein when the second end of the mounting assembly is rotated, the assisting portion is located above the signal module, and the rotating portion abuts the signal module.

3. The electronic device of claim 1, wherein the rotating portion is curved.

4. The electronic device of claim 1, wherein the first installation piece is substantially perpendicular to the second installation piece.

5. The electronic device of claim 1, wherein the connecting portion extends from an edge of the limiting portion along a first direction, the first installation piece extends from the edge of the limiting portion along a second direction, and the first direction being opposite to the second direction; and the first direction and the second direction are substantially perpendicular to the limiting portion.

6. The electronic device of claim 1, wherein the signal module further comprises a case, the case comprises a top wall and a sidewall connected to the top wall, the signal card is secured to the sidewall, and the assisting member abuts the top wall.

7. The electronic device of claim 6, wherein the chassis comprising a bottom plate and a bracket located on the bottom plate, the mounting assembly is above the bottom plate, and the bracket is secured to the sidewall.

8. The electronic device of claim 7, wherein the top wall is substantially parallel to the bottom plate and located between the assisting member and the bottom plate, and the sidewall is substantially perpendicular to the top wall.

9. An electronic device comprising:
   a chassis comprising a bottom plate and a bracket secured to the bottom plate;
   a mounting assembly secured to the chassis and comprising a circuit board and a connector secured to the circuit board, and the mounting assembly being above the bottom plate;
   a signal module secured to the chassis and comprising a signal card and a case, the case comprising a top wall and a sidewall connected to the top wall; and the signal card secured to the sidewall and engaged with the connector; and
   an assisting member secured to a first end of the mounting assembly and comprising an assisting corner, and the assisting corner abutting the top wall;
   wherein the signal module is located outside of the mounting assembly and adjacent to the first end of the mounting assembly; the connector is located between the assisting corner and a second end of the mounting assembly, and the second end is opposite to the first end; the second end is rotatable about the assisting corner, and the connector is disengaged from the signal card when the second end is rotated about the assisting corner; and the top wall is located between the assisting member and the bottom plate.

10. The electronic device of claim 9, wherein the assisting member comprises a limiting portion, and a corner of the limiting portion defining the assisting corner; the assisting corner comprising an assisting portion and a rotating portion, and the assisting portion abuts the signal module.

11. The electronic device of claim 10, wherein when the second end of the mounting assembly is rotated, the assisting portion is above the signal module, and the rotating portion abuts the signal module.

12. The electronic device of claim 10, wherein the rotating portion is curved.

13. The electronic device of claim 10, wherein the assisting member further comprises a connecting portion and an installation portion; the installation portion comprises a first installation piece and a second installation piece; the connecting portion connects the limiting portion to the second installation piece; and the first installation piece and the second installation piece are secured to the mounting assembly.

14. The electronic device of claim 13, wherein the first installation piece is substantially perpendicular to the second installation piece.

15. The electronic device of claim 13, wherein the connecting portion extends from an edge of the limiting portion along a first direction, the first installation piece extends from the edge of the limiting portion along a second direction, and the first direction being opposite to the second direction; and the first direction and the second direction are substantially perpendicular to the limiting portion.

16. The electronic device of claim 9, wherein the top wall is substantially parallel to the bottom plate, and the sidewall is substantially perpendicular to the top wall.

17. The electronic device of claim 9, wherein a frame and an inserting member are located on the circuit board, and the frame and the inserting member are adapted for securing an expansion card.

18. An electronic device comprising:
a chassis;
a mounting assembly secured to the chassis and comprising a circuit board and a connector secured to the circuit board;
a signal module secured to the chassis and comprising a signal card, and the signal card is engaged with the connector; and
an assisting member secured to a first end of the mounting assembly and comprising an assisting corner and a limiting portion, and the assisting corner abutting the signal module;
wherein the connector is located between the assisting corner and a second end of the mounting assembly, and the second end is opposite to the first end; the second end is rotatable about the assisting corner, and the connector is disengaged from the signal card when the second end is rotated about the assisting corner; the assisting member further comprises a connecting portion and an installation portion; the installation portion comprises a first installation piece and a second installation piece; the connecting portion connects the limiting portion to the second installation piece; and the first installation piece and the second installation piece are secured to the mounting assembly.

* * * * *